May 6, 1924.

S. S. GRIFFIN 1,493,339

SLEIGH ATTACHMENT FOR MOTOR DRIVEN VEHICLES

Filed Feb. 28, 1923

INVENTOR.

BY Sidney S. Griffin

Geo. P. Kimmel ATTORNEY.

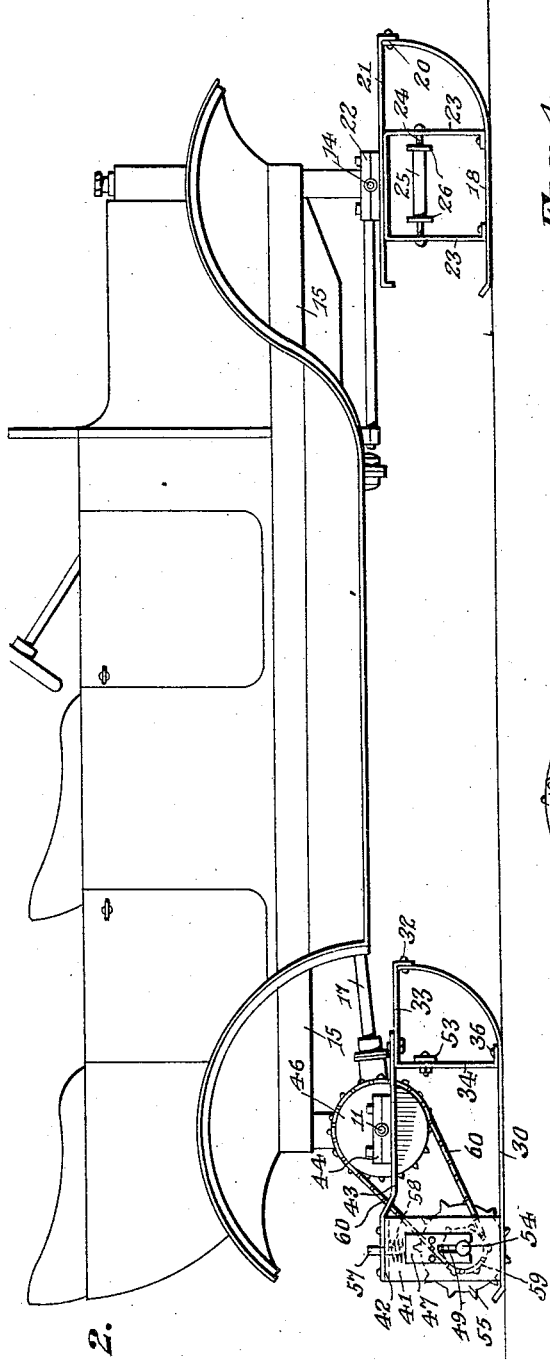
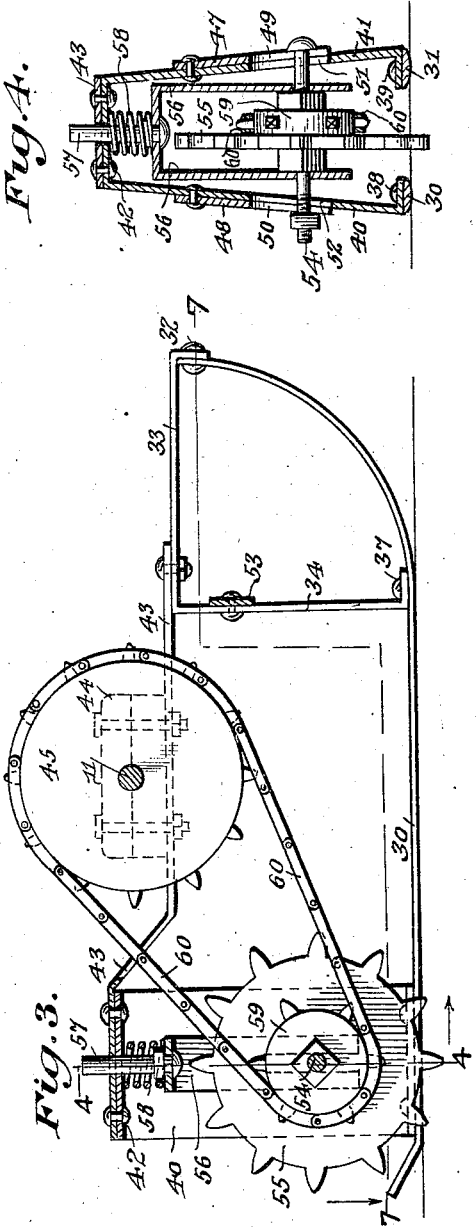

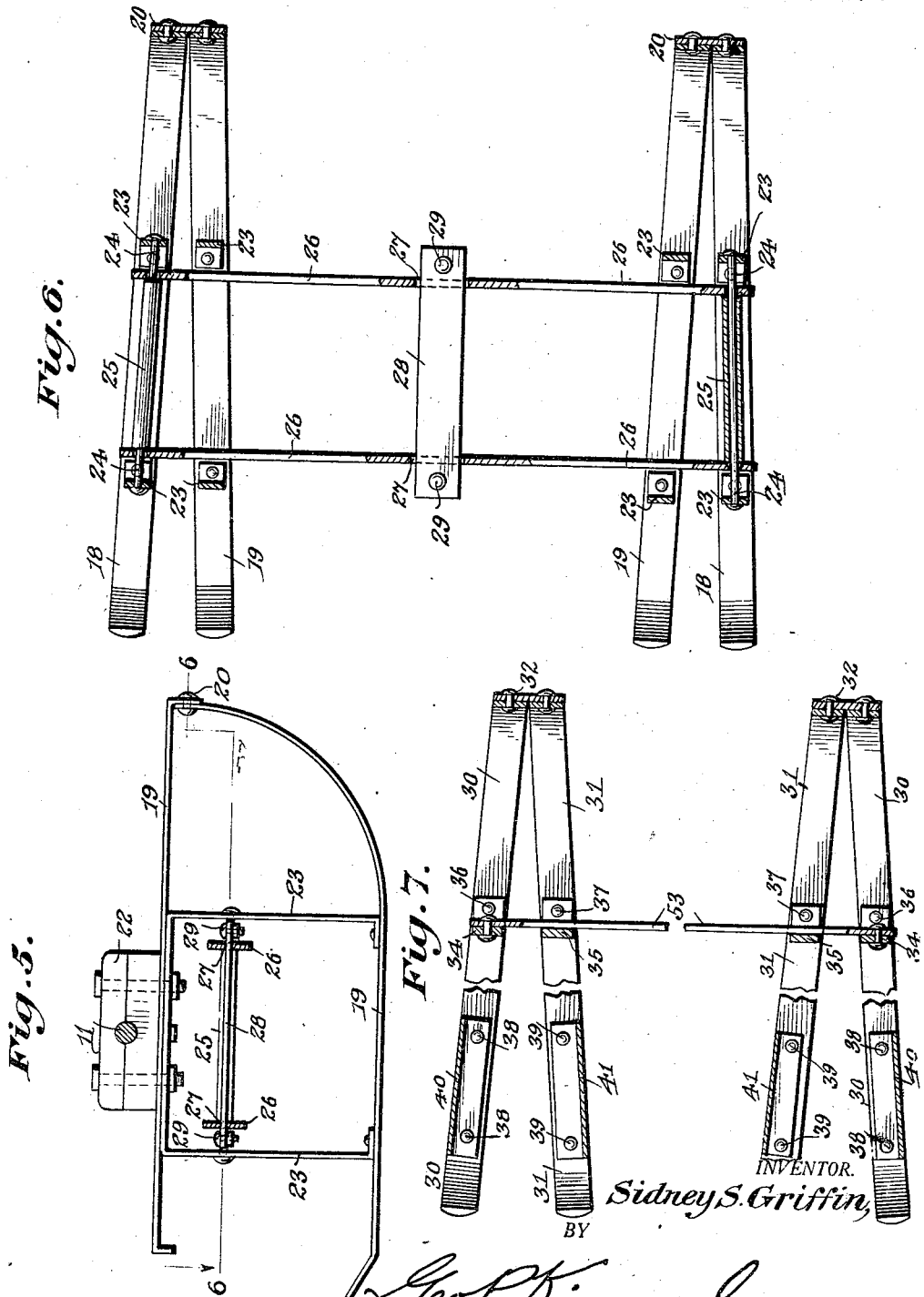

Patented May 6, 1924.

1,493,339

UNITED STATES PATENT OFFICE.

SIDNEY S. GRIFFIN, OF DETROIT, MICHIGAN.

SLEIGH ATTACHMENT FOR MOTOR-DRIVEN VEHICLES.

Application filed February 28, 1923. Serial No. 621,864.

*To all whom it may concern:*

Be it known that I, SIDNEY S. GRIFFIN, a citizen of the United States, residing at Detroit, in the county of Wayne and State of Michigan, have invented certain new and useful Improvements in Sleigh Attachments for Motor-Driven Vehicles, of which the following is a specification.

This invention relates to sled runner attachment for motor driven vehicles, and has for one of its objects to simplify and improve the construction and increase the efficiency and utility of devices of this character.

Another object of the invention is to provide a device of this character including a novel arrangement of the runners whereby they are kept clean from the accumulations of snow and whereby in coaction with ice or snow engaging tractor wheels a certain amount of gathered snow will be held in position to operate as an anti-skid element, to prevent lateral displacement of the vehicle.

With these and other objects in view the invention consists in certain novel features of construction as hereinafter shown and described and then specifically pointed out in the claims, and in the drawings illustrative of the preferred embodiment of the invention—

Figure 2 is a side elevation of the parts shown in Figure 1.

Figure 3 is an enlarged side elevation, partly in section, of one of the rear runners and its traction wheel and operating mechanism.

Figure 4 is a longitudinal section on the line 4—4 of Figure 3.

Figure 5 is an enlarged side elevation of one of the forward runners partly in section.

Figure 6 is an enlarged plan view of the forward runners in section on line 6—6 of Figure 5.

Figure 7 is a plan view of the rear runners, partly in section.

Figure 1:
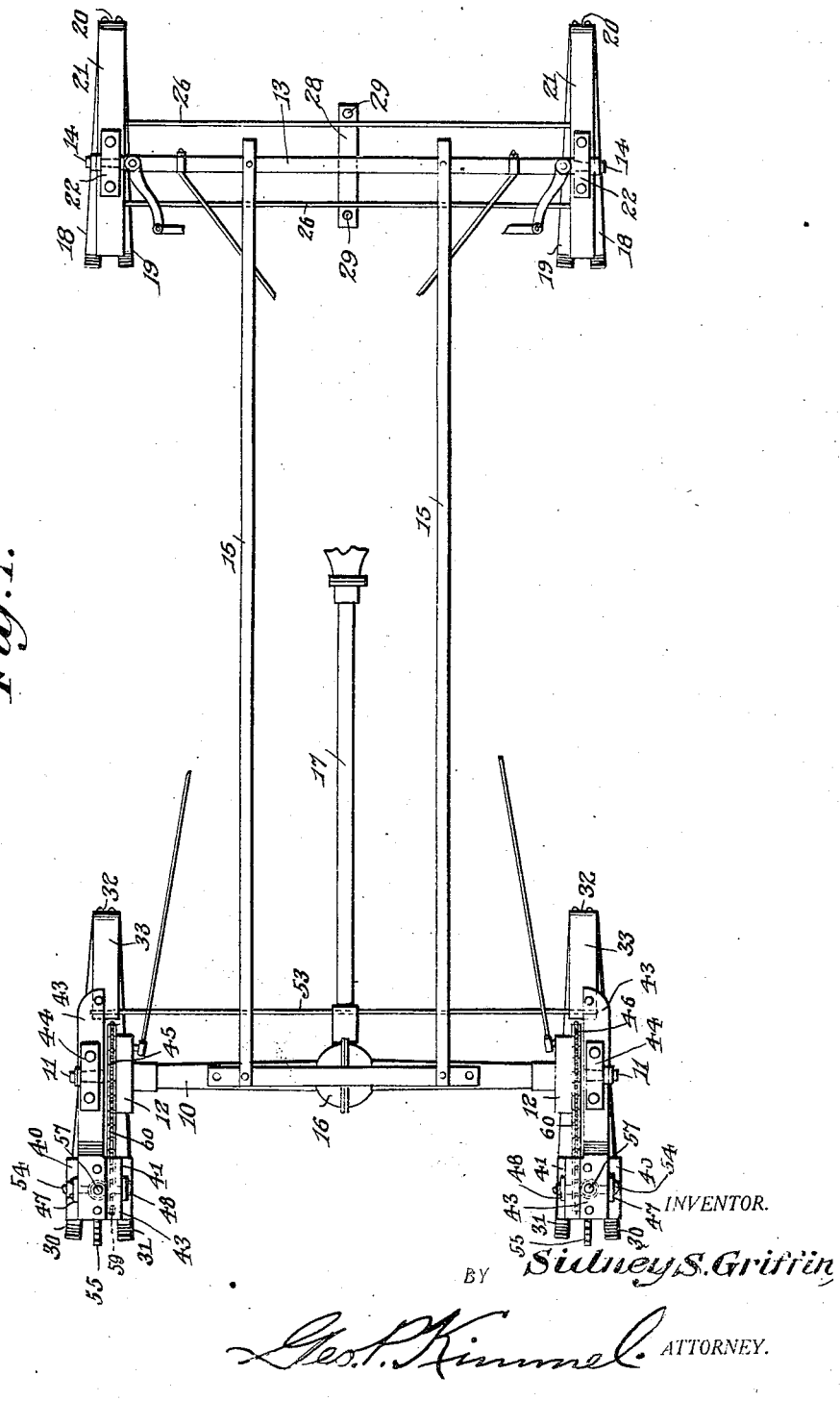
Figure 1 is a plan view of the running gear of a conventional motor driven vehicle including the front and rear axles, with the improvement applied.

The improved device comprises in general a pair of coupled forward runners having bearings whereby they may be mounted on the journals of the forward axle, and a pair of coupled runners having bearings whereby they may be coupled to the rear axle of a motor driven vehicle.

For the purpose of illustration the device is shown applied to the supporting frame of a conventional motor driven vehicle, and including the rear or driven axle casing 10 having the terminal journals 11, the usual brake bands 12. The forward axle is represented at 13 with its journals 14 and coupled to the rear axle casing 10 by the usual tie rods 15. The casing for the differential gear is represented at 16 and a part of the drive shaft housing at 17.

Each of the forward runners is formed in two portions 18 and 19 curving upwardly toward the front and united in close proximity at 20 to an upper horizontal rail 21, the two parts of the runner diverging or spreading toward the rear, as shown, so that as the runners are drawn over the snow they will automatically clear themselves of accumulations of snow, and the latter prevented from clogging the runners.

Another advantage gained by forming the runners each in two parts is that the runners are thereby effectually prevented from skidding or slipping laterally, as the grip on the snow against lateral movement is thereby materially increased.

Mounted on each of the rails 21 is a bearing 22 to receive the journals 14 of the forward axle mechanism.

Extending between the runner portions 18 and 19 and the rails 21 are substantially vertical stays 23 in spaced relation, each outer pair of the stays being connected by a guide rod 24. Slidable on each guide rod is a tubular spacer member 25, and journaled upon the rods are transverse stay bars 26, the bars being maintained in spaced relation by the tubular spacer members 25, while at the same time each pair of spacer rods are movable longitudinally of the runners to a certain extent.

Each of the bars 26 is pierced intermediate the ends with a longitudinal slot 27, and loosely engaging through these slots is a holding bar 28 having stops 29 in the ends externally of the outer faces of the bars 25. By this means a certain degree of looseness or play is provided for between the runners, to prevent cramping or binding in event of the steering knuckles being turned abnormally to the right or left.

By this means the forward runners may be turned to the right or left to the required extent to steer the vehicle in the same manner as when the tractor wheels are in position on the journals of the forward axle, but will be prevented by the checking action of the member 28 and its spaced stops 29 from abnormal lateral movement.

The rear runners are substantially the same in outline as the forward runners and each comprises two portions 30 and 31 curving upwardly toward the front and united in close proximity at 32 to an upper horizontal rail 33, the two parts of the runners diverging or spreading toward the rear in the same manner as the forward runners and for the same purpose, as before described.

In the rear runner construction the upper rail 33 is stopped short of the lower or snow engaging portions 30 and 31 and is turned down in two portions as represented at 34 and 35 and riveted or otherwise secured to the runner members 30 and 31 as represented at 36 and 37.

Supported by rivets or the like as shown at 38 and 29 to the runner members 30 and 31 near the rear, are housings in which the tractor devices are mounted. Each housing comprises side walls 40 and 41 and connecting top portions 42 and each supported by a brace 43 from the shortened rail 33, as shown. The bearings 44 for the rear axle journals 11 are mounted on the braces 43, and also mounted respectively on the journals 11 are chain wheels 45 and 46.

Attached to the outer faces of the side walls 40 and 41 of the tractor wheel housings are reinforcing plates 47 and 48, the latter having downwardly opening slots 49 and 50 which register with corresponding slots 51 and 52 in the housing walls 40 and 41, as represented in Figure 4.

A stay 53 is attached to the downturned portions 34 of the forward runners, and operates to rigidly support the latter from lateral displacement.

A shaft 54 extends through the registering slots in the housings as shown more clearly in Figure 4 and carries a tractor wheel 55, preferably toothed, and extending through the space between the runner members 30 and 31. By this arrangement the tractor wheels can be adjusted vertically but are held from forward or rearward movement by the walls of the slots.

Engaging each of the shafts 54 at opposite sides of the wheels 55 are yoke devices 56, and from the upper end of each yoke a guide stud 57 extends through the adjacent top 43 of the housing. The tractor wheels operate respectively between the walls of the yoke devices with the hubs of the tractor wheel engaging the inner faces of the same, as shown in Fig. 4.

A relatively strong spring 58 surrounds each of the guide studs 57 and exerts their force to hold the wheels 55 yieldably in lower or operative position.

Mounted on each of the shafts 54 next to each wheel 55 and between the walls of the housing, is a relatively small chain wheel 59 over which and the wheels 46 endless chains 60 operate.

By this means the motion of the rear axle journal is imparted to the tractor wheels, and the latter held yieldably in the downward and operative position.

As the vehicle is moved forwardly the rotating tractor wheels engaging the snow or ice between the diverging runner members 30 and 31, force the vehicle forwardly while at the same time the snow gathering between the rearwardly diverging runners effectually prevents "skidding" or undue lateral movement by increasing the lateral resistance to the movement of the runners.

The improved device is simple in construction, can be manufactured of any suitable material and of any required size and adapted to vehicles of various sizes from the heaviest trucks to the lightest runabouts.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:

1. In a sleigh attachment for motor driven vehicles, runner devices having means adapted to support said runner devices on the axle journals of the vehicle, each runner device including a snow engaging portion formed of two parts diverging toward the rear, whereby the runners are self clearing and prevented from lateral displacement or skidding.

2. In a sleigh attachment for motor driven vehicles, runner devices adapted to support the axle journals of the vehicle and each including a snow engaging portion formed of two parts diverging toward the rear, a tractor wheel carried by each runner and engaging the snow between the diverging runner parts, and means adapted to operate the tractor wheels from the rear axle of the vehicle.

3. In a sleigh attachment for motor driven vehicles, runner devices adapted to support the axle journals of the vehicle and each including a snow engaging portion formed of two parts diverging toward the rear, a housing supported by the diverging runner parts and provided with vertical guide slots, shafts slidable and rotative in said slots, a tractor wheel carried by each shaft and extending between said runner parts, and means adapted to operate the tractor wheels from the rear axle of the motor driven vehicle.

4. In a sleigh attachment for motor driven vehicles, runner devices adapted to support the axle journals of the vehicle and each including a snow engaging portion formed of two parts diverging toward the rear, a housing supported by the diverging runner parts and provided with vertical guide slots, shafts slidable and rotative in said slots, a tractor wheel carried by each shaft and extending between said runner parts, a yoke device engaging said shaft, and means for yieldably supporting said yoke device relative to said housing.

5. In a sleigh attachment for motor driven vehicles, runner devices adapted to support the axle journals of the vehicle, a housing supported by said runner parts and provided with vertical guide slots, shafts slidable and rotative in said slots, a tractor wheel carried by each shaft, a yoke device engaging said shaft and having a guide stud extending slidably through said housing, and a tension spring between said housing and yoke device.

In testimony whereof, I affix my signature hereto.

SIDNEY S. GRIFFIN.